Feb. 7, 1961     D. J. KLYCE     2,970,694
DRIVE AND COUPLING FOR SCREENS
Filed April 18, 1958
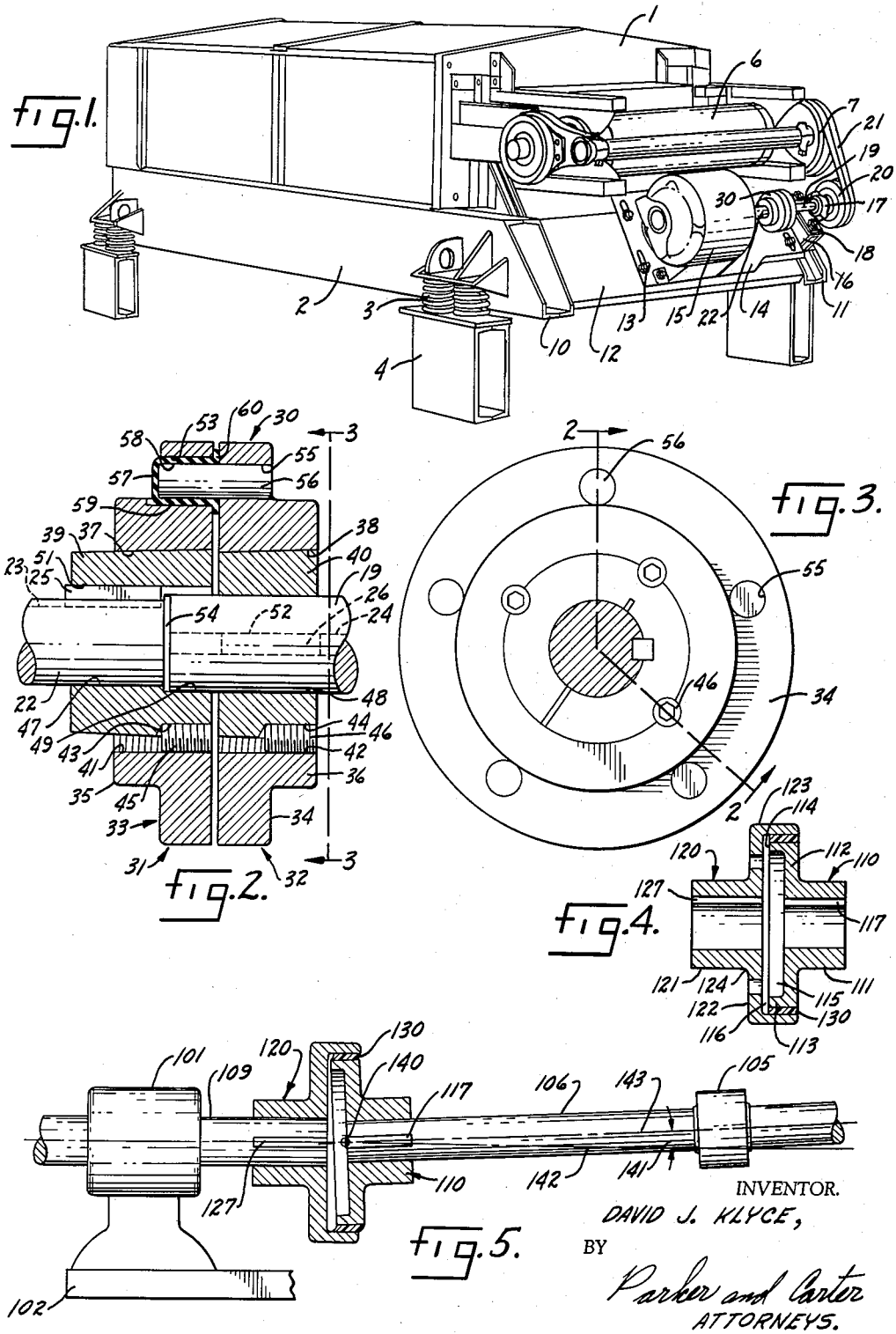
INVENTOR.
DAVID J. KLYCE,
BY
Parker and Carter
ATTORNEYS.

United States Patent Office 2,970,694
Patented Feb. 7, 1961

2,970,694

DRIVE AND COUPLING FOR SCREENS

David J. Klyce, North Hollywood, Calif., assignor to Nordberg Manufacturing Company, Milwaukee, Wis., a corporation of Wisconsin Filed Apr. 18, 1958, Ser. No. 729,307

5 Claims. (Cl. 209—367)

My invention resides in the screening field and is particularly directed to the problem of coupling a vibrating screen to a power source.

Accordingly, a primary object of my invention is the provision of a screening assembly including a screen adapted for sorting and classifying processes and the like, a motor adapted to be rigidly attached to the assembly, a vibrating mechanism for the screen and a flexible coupling for connecting the vibrating mechanism to the motor.

Another object is the provision of a flexible coupling for use on screens or the like which is adapted to couple the ends of a drive shaft and a driven shaft, allowing angular misalignment between the two shafts but restricting axial misalignment between the two.

Another object of my invention is the provision of a screening assembly in which a screen suspended on a frame is actuated by a vibrator assembly including a power source located some distance from vibratory means and a flexible coupling disposed between the motor and the vibratory means so that the power will be positively transmitted to the vibratory mechanism without undue stress in the power shafts.

Another object is the provision of a torque transmitting coupling which will strongly force the coupled ends of a pair of abutting shafts to rotate about a common center and yet permit a measure of angular misalignment between the two shafts.

A further object is the provision of a self-aligning coupling composed of two parts integrally joined with a flexible member which permits relative angular displacement between the two parts and yet grips each firmly in order to transmit power from one to another.

Another object is the provision of a screening assembly in which power from a source mounted on the assembly will be positively transmitted to the actuating mechanism for the screen with a minimum of fatigue stress being induced in the transmitting members, wherever the source is positioned with respect to the center line ($\mathbb{C}$) of the screen or its supporting structure.

Other objects will become apparent from time to time throughout the course of the ensuing specification.

My invention is illustrated more or less diagrammatically in the drawings wherein:

Figure 1 is a perspective view of a screening assembly showing my new and improved motor and coupling assembly;

Figure 2 is a cross section of one embodiment of my flexible coupling;

Figure 3 is a view taken along the line 3—3 of Figure 2;

Figure 4 is a cross-section through a second form of my coupling; and

Figure 5 is a partial view of a motor assembly with the coupling of Figure 4 in section.

Like reference numerals are used to indicate like parts throughout the description of the drawings.

Referring now to the drawings and particularly to Figure 1, a vibrating screen assembly is shown as including a screen enclosed in a suitable housing 1 securely mounted on a base or frame 2 which in turn is secured to shock absorbing springs 3 fastened to ground supports 4. At one end of the screen there is shown a vibrating assembly generally indicated at 6 including a suitable power connection 7.

The frame 2 is composed of a pair of longitudinal members 10 and 11 and cross connecting members 12. Rigidly mounted to cross member 12 by means of bolts 13 is a plate 14 upon which a power source 15 such as an electric motor and a bearing support 16 are mounted. A bearing 17 in which a power transmitting or countershaft 19 is journaled may be mounted on the platform 16 and suitably secured thereto by bolts or other connecting means 18. The bearing may be a floating bearing which will permit a measure of angular displacement of the shaft. The outboard end of the countershaft 19 extends through the bearing and is secured to a power take-off wheel 20 having a suitable linkage 21 running up to the power connection 7.

A motor or power shaft 22 is connected to countershaft 19 by a flexible coupling 30 which tends to maintain the abutting ends of the two shafts in substantial axial alignment near the point of junction yet permits a measure of angular misalignment.

In Figure 2 the flexible coupling is shown as composed of driving and driven members 31 and 32 adapted to receive the ends of the motor and countershaft respectively to transmit power from one to the other. Driving member 31 includes a circular motor flange 33 having an outstanding hub 35. The hub is bored at 37 to receive a sleeve or motor bushing 39. While not essential I preferably form bore 37 with a slight taper and machine the external surface of bushing 39 to mate therewith. The flange 33 is bored and threaded as at 41 and the bushing has mating holes 43 which receive locking screws 45.

The bushing has an internal bore 47 of a dimension suitable for receiving motor shaft 22 with a close fit and is counter-bored as at 49 for a substantial distance in order to receive the projecting end of the countershaft. A suitable keyway is shown at 51.

The extreme edges of the flange 33 are bored as at 53 for a purpose which will appear hereinafter. Shaft 22 may be provided with a keyway 23 and key 25, but it will be understood that any suitable means may be used for securing the shaft to the bushing.

The driven half of the coupling 32 is shown as comprised of a countershaft flange 34 and a hub portion 36 which is bored at 38 to receive a driven bushing 40. The bore in the hub may be tapered to mate with a suitable taper on the bushing 40. The hub is bored at 42 and the bushing at 44 to receive suitable locking screws 46. The bushing is formed with a bore 48 which is the same dimension as bore 49 in the driving half and a keyway 52 is formed therein in a position angularly displaced with respect to keyway 51. Countershaft 19 with its keyway 24 and key 26 extends into the counter base in the motor flange bushing with a close fit. A suitable clearance is provided at 54.

The countershaft flange has a plurality of bores 55 and a series of pins 56 are received therein and extend into the motor flange. A flexible thimble 57 having an internal bore 58 for reception of pin 56 is received in bore 53. The thimble has a shank 59 and spacing flange 60 which serves to maintain a clearance between the two halves of the coupling. The thimble may be formed of a resilient material capable of being securely attached to pin 55 and bores 53. Rubber for example, has proven satisfactory and may be bonded to both the pin and the holes in the motor flange.

In Figure 4 I have shown a detailed cross-sectional view of a modified form of coupling. It is composed principally of three parts, a power take-off or driven half 110, a power input or driving half 120, and a suitable joining member 130. It will be understood that my coupling is capable of transmitting power in either direction, and I have arbitrarily shown and designated input and output halves for convenience of description only. The driving half consists of a hub 121 terminating in a disc portion 122 having an outstanding annular flange 123 at the peripheral edge.

I have shown the junction between the disc portion 122 and the hub 121 as having a rounded fillet 124, but it will be understood that a sharp junction could be formed. Similarly, although the outside surface of the hub 121 may be left in its as cast condition, it is entirely possible that it may be convenient to machine it for the reception of a hollow power shaft. At 127 I have indicated a keyway which connects shaft 109 to the hub by means of a key, set screw or other suitable securing means.

The driven half of the coupling is shown generally at 110 and consists of a hub 111 and a disc 112 having a projecting annular flange 113. The axial length of flange 113 is less than that of flange 123, and disc 112 is of a lesser diameter than disc 122, so that the disc 112 and flange 113 may be telescopically, co-axially received within the flange 123. Keyway 117 is formed in the sleeve 111. It will be noted that the projecting flange 113 forms an internal cavity or seat indicated generally at 115 and when in assembled relationship, there will be a clearance 116 between the two hubs.

Between the internal surface of the flange 123 and the external surface of the flange 113, I have shown a flexible plastic ring member 130 secured to the respective surfaces. Any suitable material may be used, such as rubber which could be vulcanized to the surfaces. I contemplate that even a plastic material which has the characteristics of being able to bond with metal, may be used.

In Figure 5 I have shown a partial cross-sectional view of my self-aligning coupling assembled with a driving shaft 109 and a driven shaft 106. The driving shaft 109 extends from the motor 101 mounted upon a base 102. The outboard end of the driven shaft is shown supported in a floating bearing 105 as previously described in connection with Figures 1–3. At 142 I have indicated the center line of the fixed shaft 109 and at 143 the center line of the driven shaft 106. Suitable securing arrangements such as keyways 117 and 127 with mating keys join the shafts to the halves 110 and 120 respectively, and a resilient ring member 130 is positioned between the flanges.

The center line 143 of the driven shaft 106 is shown displaced from the center line of the driving shaft as indicated by the angle 141. It is desirable that a point on the center line of the shaft 106 near the center of the coupling will be coaxial with the center line 142 of the driving shaft 109, so that a condition of dynamic balance will be maintained when the shafts rotate, and the axial misalignment will be minimized. The resilient member 130 deforms to permit the keyed end of the driven shaft 106 to float in the coupling.

Whereas I have shown the driven shaft 106 as terminating entirely within the driven half of the coupling 110 it is entirely feasible to project the end of the shaft into the driving half 120 of the coupling in order to secure close fitting engagement thereto as in Figure 2.

The use and operation of my new and improved screening assembly is as follows:

Frequent replacement of parts and continual maintenance is necessary on the motor connecting linkage and vibratory mechanism assemblies on vibrating screens. Due to the eccentric motion of the screen created by the vibratory mechanism any operative parts located a substantial distance from the screen are subjected to extreme fatigue and wear stresses. The motor and bearings associated with the driving connection between the motor and the vibratory mechanism are especially susceptible due to the extended distance between the motor and the power input point to the vibrator mechanism. With my flexible coupling and the floating bearing at the end of a lengthy power transmitting shaft, the power source may be positioned at any place on the frame, or, conceivably, on the screen itself. This is important because it may not always be convenient to position the power source exactly at the location on the frame or screen which will be least subject to vibration.

The coupling shown in Figures 4 and 5 will allow for some degree of flexibility between the discontinuous power shaft extending from the motor and the transmission shaft leading to the vibratory mechanism. Usually the coupling is first assembled with the rubber thimbles bonded to both the driven and driving halves of the coupling. The coupling is fitted over the ends of the shaft and it is preferable to pilot the power transmitting shaft 19 in the driving half of the coupling. With this construction a certain amount of angular deflection will be permitted between the axis of the two shafts but axial deflection will be minimized so that there will tend to be a point along the axis of the driven shaft falling upon the projection of the longitudinal axis of the driving shaft at all times. It will be understood that the deflections are substantially smaller than those shown in Figure 5 for example, and will be on the order of fractions of an inch.

The coupling of Figures 4 and 5 may be assembled as a unit and then fitted onto abutting ends of the shafts. Preparatory to assembling the coupling halves, the external surface of the flange 113 and internal surface of the flange 123 may be suitably prepared for reception of the plastic torque transmitting material 130. Usually some machining will be required. The material 130 is preferably rubber or rubber-like in flexibility and consistency and may be vulcanized or otherwise joined to the surface in any suitable manner. Preferably I employ a firm rubber for I do not contemplate that a great deal of flexibility will be needed. That is, the measure of angular misalignment between the shafts will usually be on the order of fractions of an inch, and the flexibility and compressibility of the rubber selected may be sacrificed for strength and toughness. The bores of the hubs will usually be machined and the coupling may then be placed over the end of one of the shafts and suitably secured by a set screw, key or other suitable securing means. The other end of the coupling may then be slipped over the other exposed shaft end and suitable securing means employed.

While it will be understood that any suitable resilient member may be applied between the flanges of the respective halves, I have found that rubber or synthetic rubber is extremely adaptable and will provide a safe, sure grip when bonded to the surfaces, but will at the same time be sufficiently compressible and flexible to permit one half of the coupling to deflect angularly with respect to the other half, but not to deflect radially to any appreciable extent.

It will be noted that my coupling consists essentially of only three parts, which makes it extremely inexpensive to manufacture and immune to wear.

I claim:

1. In combination in a screen assembly, a screen, flexible means for supporting the screen from any suitable base, and an unbalanced vibrator assembly carried by the screen, said vibrator assembly including a motor mounted off the longitudinal center of the screen and a vibrator located a substantial distance from the motor operable to furnish an unbalanced impulse to the screen, and power transmitting and coupling means for transferring power from the motor to the vibrator along a non-linear path, said power transmitting and coupling means including a motor shaft and a vibrator shaft joined by a flexible coupling.

2. The structure of claim 1 further characterized in that the flexible coupling consists of a pair of rigid members secured to at least one resilient member operatively disposed there between, the coupling being secured to the shafts to couple the oppositely disposed shaft ends and strongly force them together to thereby permit angular misalignment while restricting axial misalignment between the shafts.

3. The structure of claim 2 further characterized in that the resilient member has the general characteristics as to flexure and compressibility of rubber.

4. A motor and vibrator assembly for screening assemblies including a base, a motor mounted on the base having a power output shaft, at least one bearing mounted on the base, a vibrator having a driven shaft rotatable in the bearing and substantially co-axial with the power shaft, and a flexible coupling between the power and driven shafts formed and adapted to support the shafts in axial alignment with one another, the coupling including a pair of coupling halves, the halves being adapted for connection to the abutting ends of the shafts, one halve having an annular flange overlying a similar annular flange on the other halve, and a resilient power transmission member secured therebetween.

5. In a vibratory screen and drive therefor a base, a screen deck and means for movably supporting the screen deck on the base including a plurality of springs, an unbalanced vibrator on the deck, a motor having a discontinuous output shaft mounted on one end of the deck at a point remote from the area of least vibration and a flexible drive between the motor and the unbalanced vibrator including a power transmitting member between the vibrator and the discontinuous output shaft, said shaft including a coupling adapted to couple the ends of the discontinuous portions of the shaft.

References Cited in the file of this patent
UNITED STATES PATENTS

| | | |
|---|---|---|
| 1,200,143 | Schrade | Oct. 3, 1916 |
| 1,204,925 | Aldrich | Nov. 14, 1916 |
| 2,008,648 | Symons | July 16, 1935 |
| 2,041,507 | Zeder | May 19, 1936 |
| 2,148,139 | Symons | Feb. 21, 1939 |
| 2,250,448 | Edwards | July 29, 1941 |
| 2,326,451 | Fawick | Aug. 10, 1943 |
| 2,445,175 | Hittson | July 13, 1948 |
| 2,460,628 | Fawick | Feb. 1, 1949 |
| 2,477,447 | Fawick | July 26, 1949 |